Figure 1:
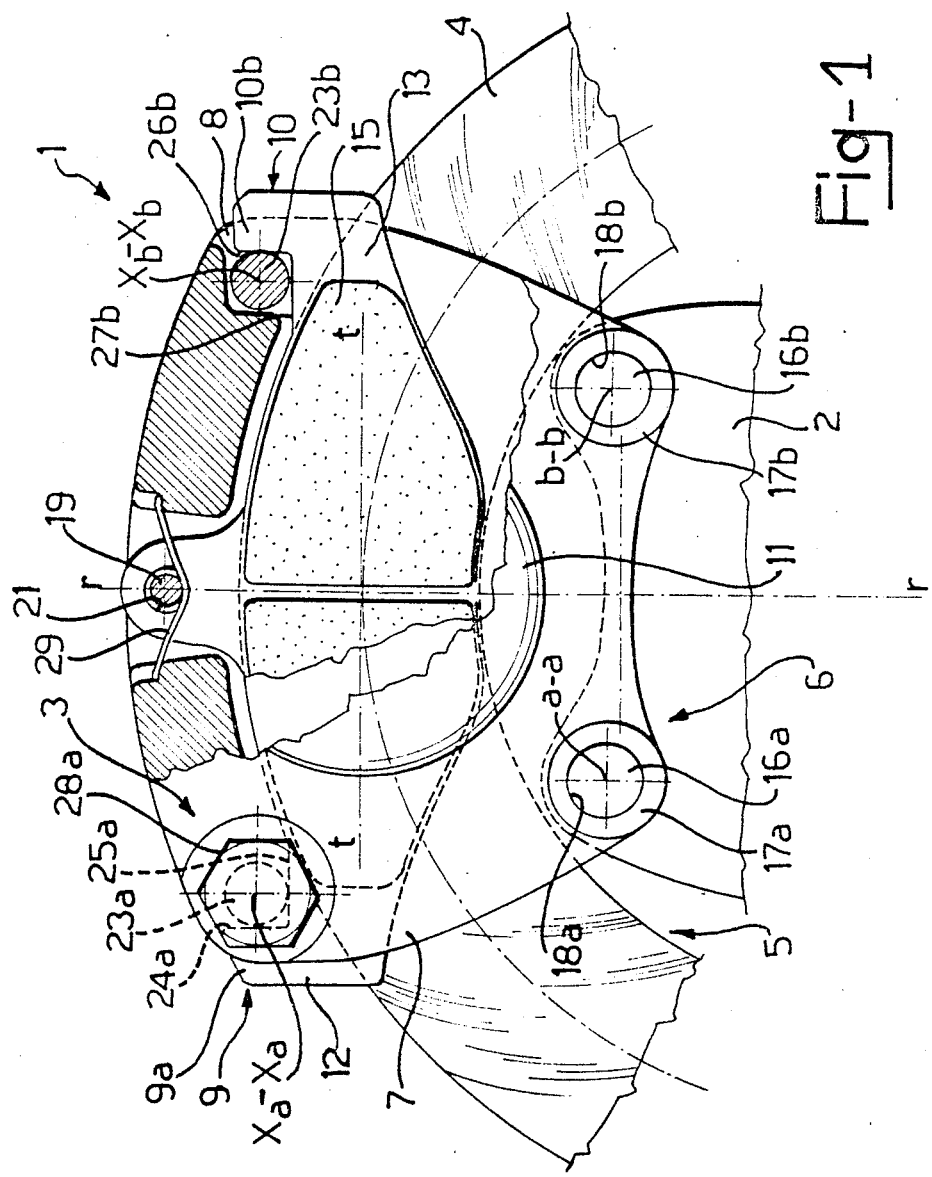

United States Patent [19]
Giorgetti

[11] Patent Number: 4,944,371
[45] Date of Patent: Jul. 31, 1990

[54] DISC BRAKE WITH A CALIPER BODY AND PADS RETAINED IN THE CALIPER BODY BY HOOKS

[75] Inventor: Alberto Giorgetti, Brembate Sopra, Italy

[73] Assignee: Via Provinciale, Paladina, Italy

[21] Appl. No.: 370,146

[22] Filed: Jun. 22, 1989

Related U.S. Application Data

[63] Continuation of Ser. No. 752,940, Jul. 8, 1985, abandoned.

[30] Foreign Application Priority Data

Jul. 9, 1984 [IT] Italy .............................. 22508/84[U]

[51] Int. Cl.$^5$ ............................................. F16D 65/06
[52] U.S. Cl. ................................ 188/73.39; 188/73.31; 188/73.45
[58] Field of Search .................... 188/71.1, 73.1, 73.31, 188/73.32, 73.33, 73.34, 73.37, 73.38, 73.39, 73.44, 73.45

[56] References Cited

U.S. PATENT DOCUMENTS

| | | | |
|---|---|---|---|
| 3,756,353 | 9/1973 | Bombassei et al. | 188/73.44 X |
| 3,862,674 | 1/1975 | Vananrooy et al. | 188/73.45 |
| 3,887,045 | 6/1975 | DeHoff et al. | 188/73.45 |
| 4,279,331 | 7/1981 | Lupertz | 188/73.37 X |
| 4,392,559 | 7/1983 | Oshima | 188/73.45 X |
| 4,476,962 | 10/1984 | Bofill | 188/71.1 |
| 4,530,423 | 7/1985 | Ritsema | 188/73.45 X |
| 4,613,019 | 9/1986 | Giorgetti | 188/73.31 |

FOREIGN PATENT DOCUMENTS

| | | | |
|---|---|---|---|
| 2931216 | 3/1981 | Fed. Rep. of Germany | 188/73.32 |
| 1379099 | 1/1975 | United Kingdom | 188/73.1 |

Primary Examiner—Duane A. Reger
Attorney, Agent, or Firm—Hedman, Gibson, Costigan & Hoare, P.C.

[57] ABSTRACT

In a disc brake of the type including a caliper body straddling a disc and having pads on opposite sides of the disc, the pads are elongate in a direction tangential to the disc and have hook-shaped ends engaged with respective pins extending parallel to each other in a mutually spaced relationship in the caliper body.

1 Claim, 3 Drawing Sheets

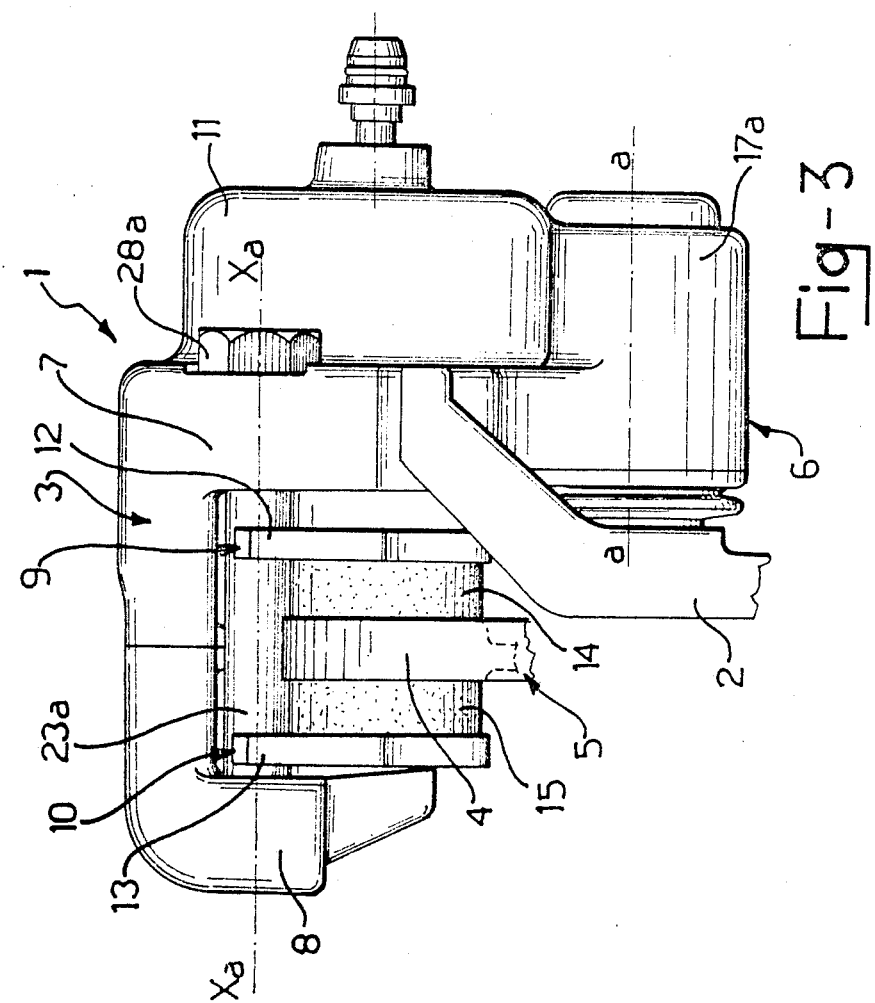

DISC BRAKE WITH A CALIPER BODY AND PADS RETAINED IN THE CALIPER BODY BY HOOKS

REFERENCE TO RELATED APPLICATIONS

This is a continuation of application Ser. No. 752,940, filed July 8, 1985, now abandoned.

DESCRIPTION

The present invention relates to a disc brake of the type including a caliper body located astride a disc and provided with pads on opposite sides of the disc.

In disc brakes of this type, it is known that the pads are housed between the jaws of the caliper body and must be retained in the caliper body in a direction tangential to the periphery of the disc during each braking action.

In disc brakes currently in use, the pads are fitted into a seat formed in the caliper body radially of the disc. During each braking action, the pads bear against one or other of the end walls of the seat according to whether the braking occurs in one direction of movement or the other.

In these disc brakes, vibrations and noise frequently occur during braking. It is also found that, following repeated sharp braking, the knocking of the pads against the end walls of the seat in which the pads are fitted causes rapid deterioration of the contact surfaces with the possibility of damage.

The object of the present invention is to provide a disc brake which has structural and functional characteristics such as to satisfy the requirement of retaining the pads in the caliper body in a direction tangential to the disc while at the same time overcoming the disadvantages mentioned above with reference to the prior art.

This object is achieved by a disc brake of the specified type which is characterised in that the pads are elongate in a direction tangential to the disc and have hook-shaped ends engaged with respective pins extending parallel to each other in a mutually spaced relationship in the caliper body.

To advantage, the pins are the shanks of respective bolts tightened with a predetermined force across the caliper body.

Figure 2:
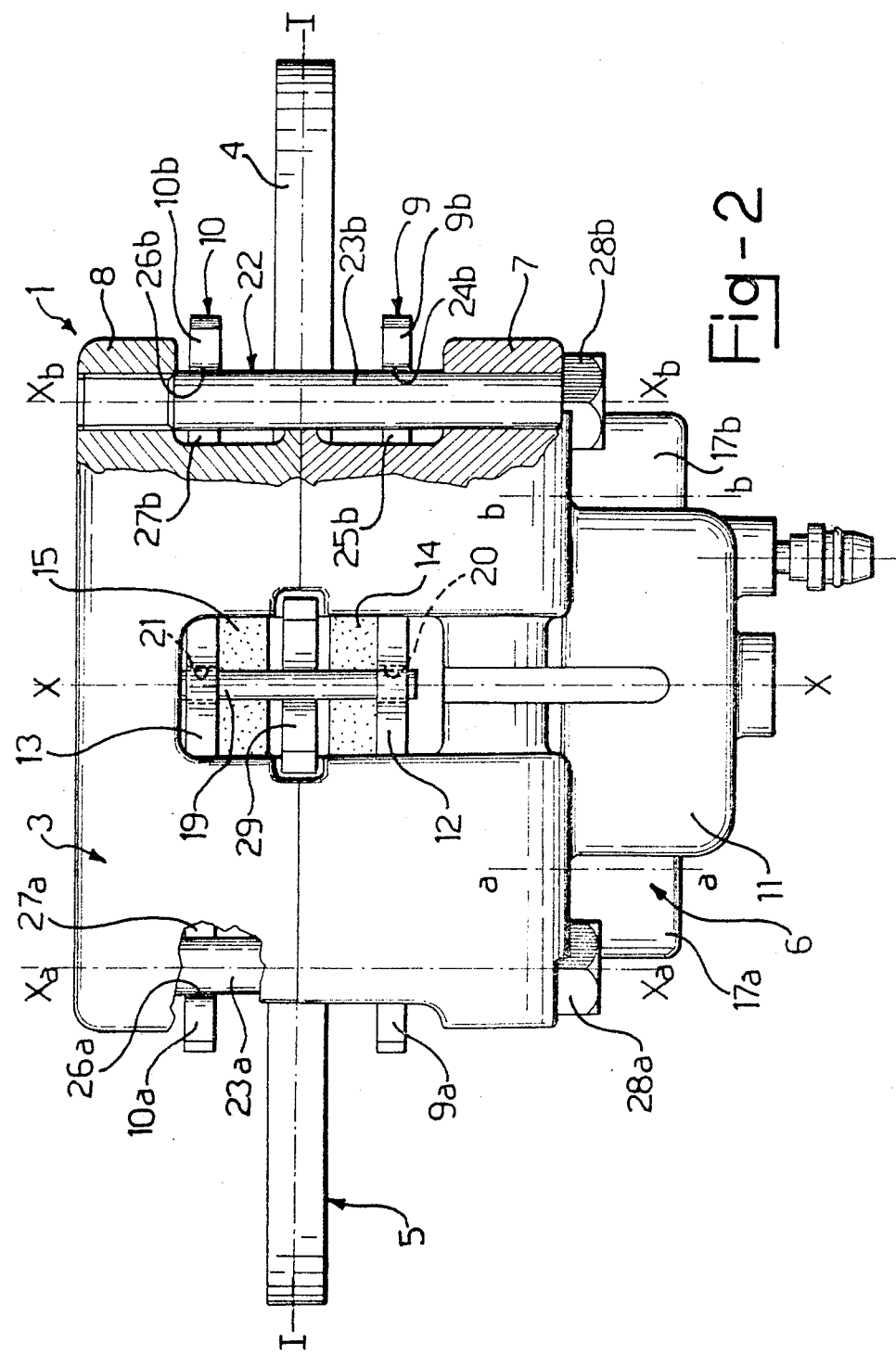

Further characteristics and advantages of the disc brake according to the invention will become apparent from the following description of a preferred embodiment given, by way of non-limiting example, with reference to the appended drawings, in which:

FIG. 1 is a partially-sectioned elevational view of a disc brake according to the invention, FIG. 2 is a partially-sectioned plan view of the disc brake of FIG. 1, and FIG. 3 is a side view of the disc brake of FIG. 1.

With reference to the appended drawings, a disc brake according to the invention is generally indicated 1 and is particularly but not exclusively intended for cars, motor vehicles and the like, for braking a wheel thereof.

The disc brake 1 includes a brake support 2 preferably cast from light alloy and preferably made integrally with a part, not shown in the drawing of the motor vehicle or the like.

The disc brake 1 also includes a caliper body, preferably cast from light alloy, which is located astride a peripheral portion 4 of a brake disc 5 having an axis X—X.

The peripheral portion 4 constitutes the annular braking band of the disc 5. In a conventional manner, the disc 5 is intended to be fixed rigidly to the wheel of the motor vehicle or the like by a portion not shown in the drawings.

Guide means, generally indicated 6, extend parallel to the axis X—X between the brake support 2 and the caliper body 3 to allow the caliper body 3 to slide relative to the support 2 in the direction X—X.

The caliper body 3 extends for a predetermined distance in a direction tangential to the disc, indicated t—t in the drawings, and includes two jaws 7 and 8 located on opposite sides of the portion 4 of the brake disc 5. The caliper body 3 is provided, in correspondence with the jaws and in a manner which will be described below, with respective brake pads 9 and 10 facing opposite faces of the portion 4, the pads also extending for a predetermined distance in the direction t—t.

In correspondence with the jaw 7, the caliper body 3 is provided in a conventional manner with a hydraulic cylinder, generally indicated 11, for urging the pad 9 against one face of the portion 4 of the disc 5 and—by reaction—the pad 10 against the opposite face of the portion 4.

More particularly, each pad 9 (10) is formed by a plate 12 (13), preferably made by blanking from a steel sheet, to which a pad 14 (15) of friction material is adhered.

The braking band 4, the pads 9 and 10, and consequently the jaws 7 and 8 of the caliper body extend in a direction r—r which is radial to the disc 5 and perpendicular the direction to X—X and t—t for a predetermined distance, preferably a fraction, for example a third, of the extent of the pads in the direction t—t.

In the disc brake 1, the guide means 6 between the caliper body 3 and the brake support 2 conventionally include two cylindrical pins 16a and 16b, with respective axes a—a and b—b, extending parallel to the axis X—X and fixed to the support 2 in a mutually spaced relationship.

In its turn, the caliper body 3 has two mutually-spaced apertured appendages 17a and 17b provided with respective cylindrical seats 18a and 18b coupled with the pins 16a and 16b, respectively, with limited play.

In the disc brake 1 according to the invention the pads 9 and 10, which are elongate and extend in the direction t—t, are supported in the caliper body 3 by a pin 19 mounted loosely on the caliper body 3 with its axis parallel to X—X. The pads 9 and 19 are loosely engaged with the pin 19 by means of respective eyelet holes 20 and 21.

Stop means, generally indicated 22, are provided for preventing movement of the pads 9 and 10 about the pin 19. The stop means 22 comprise two cylindrical pins 23a and 23b with axes $X_a$—$X_a$ and $X_b$—$X_b$, which extend parallel to the axis X—X in a mutually spaced relationship and have their ends housed in the jaws 7 and 8 of the caliper body 3 in a position immediately outside the outer peripheral edge of the braking band 4. The ends of the pads 9 and 10 are engaged with these pins 23a and 23b. For this purpose, the opposite ends of each pad 9 (10) are formed as respective hook-shaped portions 9a and 9b (10a and 10b) disposed symmetrically relative to the eyelet holes 20 (21). The hook-shaped portion 9a (10a) embraces the pin 24a in two bearing planes 24a and 25a (26a and 27a), the plane 24a (26a) extending in the direction t—t while the plane 25a (27a) is perpendicular thereto. The planes 24a, 25a, 26a and 27a all face the pin 19. Similarly, the hook-shaped portion 9b (10b) embraces the pin 23b on two bearing planes 24b and 25b (26b and 27b), the plane 24b (26b) extending in the direction t—t while the plane 25b, (27b) is perpendicular thereto. The planes 24b, 25b, 26b and 27b also all face the pin 19.

To advantage, each pin 23a (23b) constitutes the shank of a respective steel bolt 28a (28b) tightened with a predetermined force across the caliper body 3 between its jaws 7 and 8. In particular, the head of each bolt 28a (28b) bears against the jaw 7 and the threaded end engages the jaw 8. The bolts 28a and 28b, with their predetermined tightening, constitute a stiffening for the caliper body 3 and exert a preloading action on the caliper body itself opposite the action of the cylinder 11.

A small spring 29 bears against the caliper body 3 and urges it constantly against the pins 23a and 23b through the pin 19 and the pads 9 and 10, so as to prevent it rattling or vibrating when the brake is inoperative.

During operation, upon braking, the caliper body 3 locates itself on the disc 5, sliding freely along the pins 16a and 16b. Simultaneously, the hook-shaped ends 9a, 10a or 9b, 10b of the pads 9, 10 come into pressure contact with the pin 23a or 23b according to whether the braking occurs in one direction of movement of the motor vehicle or the other.

Once this condition is reached, the braking may continue as long as necessary.

The pads 9 and 10 are thus firmly retained in the caliper body by the hook-shaped portions and, upon braking, are always subjected to traction in the direction t—t by the opposing actions of the tangential braking force and the reaction of the hook-shaped portions respectively. Moreover, the pads discharge the tangential braking force on the caliper body 3 through the hook-shaped portions 9a and 10a or 9b and 10b, which react against the bolt 28a or 28b with a contact between materials of a high specific resistance (steel against steel), with the elimination of any local squashing.

By virtue of the tangential traction to which the pads are subject during braking, the disc brake according to the invention is wholly free from vibrations and noise.

Moreover, since the contact between the pads and the caliper body is through surfaces of high specific resistance, it is to be expected that the disc brake according to the invention has a long working life without damage.

A further advantage of the disc brake according to the invention lies in the lightness of the caliper body, made possible by the preloading action exerted by the bolts 28a and 28b.

Clearly, an expert in the art may make numerous modifications and variations to the disc brake described above in order to satisfy specific contingent requirements, all of which, however, are within the scope of protection for the invention as defined by the following claims.

I claim:

1. A disc brake mountable on a stationary support integral with a part of a vehicle and about a rotatable disc, said disc brake being used for braking the rotation of said rotatable disc, comprising:
   a caliper having a first and second jaw adapted to be slidably mounted on opposite sides of said rotatable disc;
   a pair of brake pads having hook shaped ends, said hook shaped ends opening away from the rotational axis of the rotatable disc, and positioned on opposite sides of said rotatable disc in a direction tangential to said rotatable disc;
   a hydraulic cylinder for urging at least one of said pair of brake pads against said rotatable disc; and
   a pair of axially extending pins positioned at either end of said caliper and engaging said hook shaped ends of said brake pads, each of said pins connecting the first jaw to the second jaw and tightened to a predetermined force so as to provide a preloaded action against the braking force of said cylinder.

* * * * *

UNITED STATES PATENT AND TRADEMARK OFFICE
CERTIFICATE OF CORRECTION

PATENT NO. : 4,944,371

DATED : July 31, 1990

INVENTOR(S) : Alberto Giorgetti

It is certified that error appears in the above-identified patent and that said Letters Patent is hereby corrected as shown below:

Title page, Assignee should read--

--Brembo, S.p.A.
Paladina, Italy--

Signed and Sealed this

Seventh Day of January, 1992

Attest:

HARRY F. MANBECK, JR.

*Attesting Officer*  *Commissioner of Patents and Trademarks*